Patented Mar. 25, 1924.

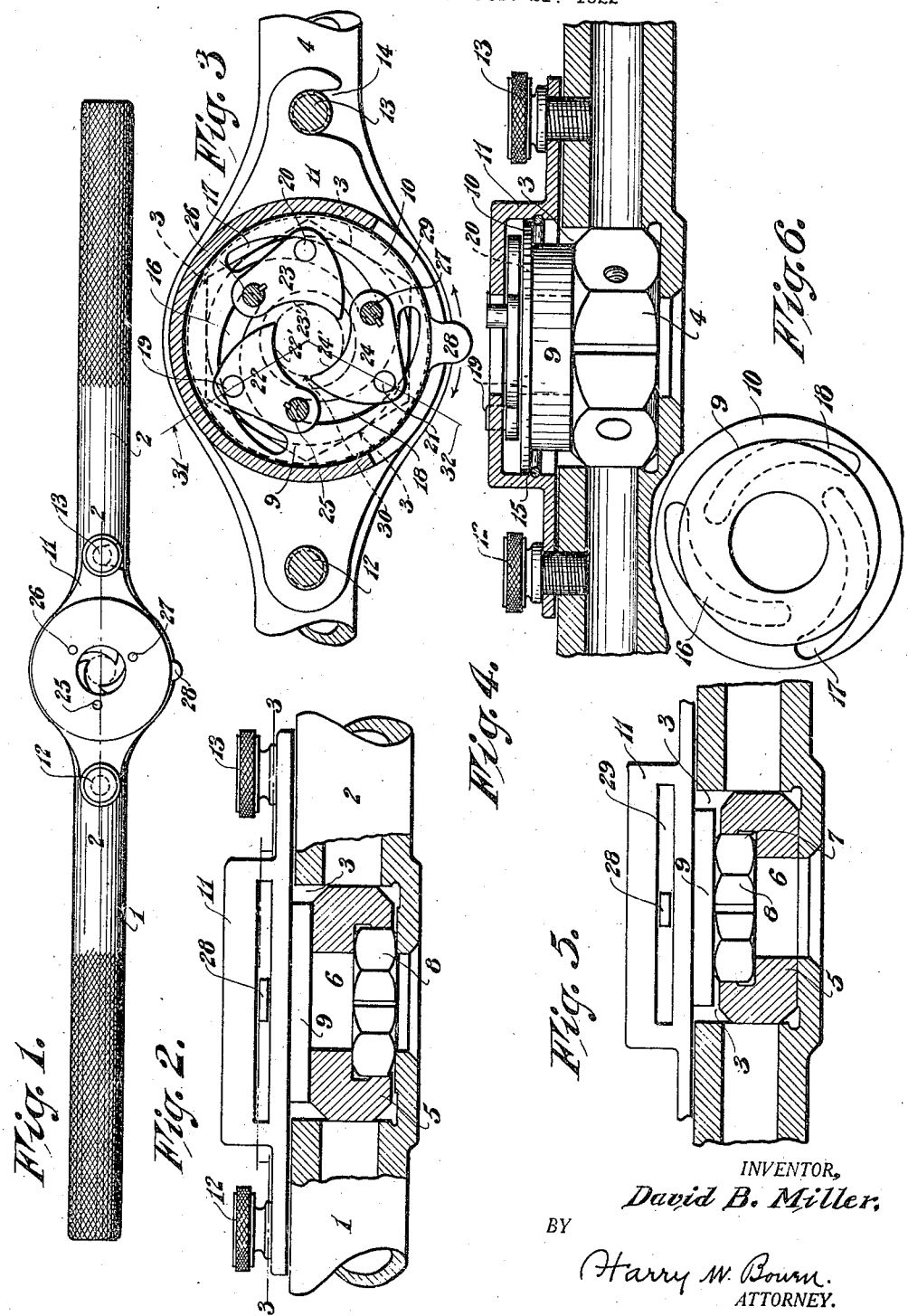

1,488,270

UNITED STATES PATENT OFFICE.

DAVID B. MILLER, OF GREENFIELD, MASSACHUSETTS.

DIESTOCK.

Application filed February 21, 1922. Serial No. 538,284.

*To all whom it may concern:*

Be it known that I, DAVID B. MILLER, a citizen of the United States of America, residing at Greenfield, in the county of Franklin and Commonwealth of Massachusetts, have invented certain new and useful Improvements in Diestocks, of which the following is a specification.

This invention relates to improvements in die stocks for the purpose of receiving and firmly clamping in place a thread cutting die, preferably of hexagonal shape and by means of which it may be turned on its work.

An object of the invention is to provide a die stock so that the die on its holder may be reversed.

A further object of the invention is to provide adjustable means for guiding the work centrally in the die during the operation of cutting a thread when the stock is rotated.

A further object is to provide means for clamping the guide for the work in position, and at the same time clamping the die in the stock.

A further object is to provide means for adjusting the guides for receiving the work on which a thread is being cut.

A further object is to provide means for readily gaining access to the recess in the die stock which receives the die or its holder.

Further objects will appear in the body of the specifications and will be particularly pointed out in the claims.

Referring to the drawings:

Fig. 1 is a plan view of the upper surface of the complete die stock showing the removable clamping plate for the die and the adjustable guides which receive the work.

Fig. 2 is a partial vertical sectional view on the line 2—2 of Fig. 1 showing an edge elevational view of the die clamping casing and the member for receiving the die, the section being taken below this casing.

Fig. 3 is a sectional view on the line 3—3 of Fig. 2 showing the interior construction below the clamping plate or casing and illustrating the movable guides for guiding the work centrally of the die and the rotatable cam plate for operating the guides.

Fig. 4 is a view similar to Fig. 2 but showing in section the clamping plate or casing and in edge elevation a die in the stock, and Fig. 5 is a view similar to Fig. 2 but with the member which holds the die reversed, that is to say, the die is located on the opposite side or face of the stock, and Fig. 6 is a bottom plan view of the rotatable disk-shaped member.

Referring to the drawings in detail:

1 and 2 designate the usual operating handles of the stock. 3 designates a recess in the center portion of the stock and as shown in Fig. 3 in dotted lines, as being hexagonal. This recess is for receiving the thread forming die 4 indicated in Fig. 4 or for receiving the die holder 5 represented in Figs. 2 and 5, when the die is a smaller one and does not fill the recess 3. The die holder 5 is formed with an opening 6 and a recessed portion 7 in which the smaller die 8 is placed. For the purpose of clamping the die 4 or the die holder 5 in the die stock a plate 9 is used. This plate is connected to or forms a part of the disk-shaped member 10 which turns freely within the cover and clamping plate member 11. This member is secured to the handles 1 and 2 by means of thumb screws 12 and 13, and will permit its ready removal.

The cover and clamping plate 11 is formed with a recess or cutout portion 14, whereby by loosening the thumb screw 13 it may be turned to one side or an open position about the thumb screw 12 as a pivot when the screw is loosened, thus gaining access to the die receiving recess 3 for the purpose of inserting the die 4 therein or the die holding member 5 shown in Figs. 2 and 5. 15 designates a spring ring that is snapped into an annular recess in the inner surface of the cover and clamping plate 11 for the purpose of retaining the plate 9 and the disk shaped rotatable member 10 in place when the cover plate is removed. The member 10 is formed with three eccentric shaped slots indicated in Fig. 3 at 16, 17, and 18. In these slots are located the ends of the pins 19, 20, and 21 which pins are fixedly secured to the three adjustable work guide plates 22, 23, and 24. Secured to these plates are the pivot pins 25, 26, and 27. These pins extend upward and turn in openings in the upper end of the cover and clamping plate 11, while the pins 19, 20, and 21 extend downward and engage the slots 16, 17, and 18 in the disk shaped rotatable member 10. 28 designates a projecting piece or handle on the rotatable plate member 10, whereby when this plate is turned by piece 28 in the slot 29 of the cover and clamping plate 11 the work guide members 22, 23, and 24 will be rotated about the pivot pins 25, 26, and 27 as centers and the pins 19, 20, and 21 will serve to move these guide plates into open or closed positions depending upon the direction in which the part 28 is moved. The inner curved surfaces of the guide plates 22′, 23′, and 24′ will engage and guide or center the work indicated in dotted lines at 30 into the die 4. These guide plates as stated are for the purpose of accurately guiding the work into the die during the operation of cutting a thread. After they are adjusted against the work the thumb screws 12 and 13 are turned down thus clamping the work guide plates 22, 23, and 24 firmly in their adjusted positions. This clamping effect will take place because the plate 9 engages the die 4 and the disk shaped member 10 will engage and move the plates 22, 23, and 24 upward against the under side of the cover plate 11, the die 4 and work guide plates will therefore be firmly clamped in place.

It is also evident that these guide members will not move out of their adjusted position since the contact surface of the work 30 with the curved surfaces 22′, 23′, and 24′ of the guide plates and the pins 19, 20, and 21 are in the same radial line of pressure as indicated by the lines 31 and 32.

Referring to Figs. 2 and 5. In Fig. 2 the die 8 is shown placed at the bottom of the die stock and is held in place by the die holder member 5 while in Fig. 5 the die 8 is placed near the top of the die stock and the die holder member 5 is reversed. This permits a thread to be cut on the work at different distances from the end or in other words the thread may be cut close to the shoulder portion of the work.

It will be seen from this construction that I have produced a die stock which is durable in construction and one that can be used for holding dies of different sizes and one that will permit the reversal of the dies whereby a thread may be cut close to a shoulder on a piece of work and also one that will accurately guide the work into the die while a thread is being cut. It also provides means for quickly interchanging dies of different sizes.

It is to be understood that I do not limit myself to the use of hexagonal dies and holders as any suitable shape may be used.

What I claim is:

1. A die stock having a recessed portion therein for receiving the die, means for holding the die in place therein, said means including a member engaging the die, a cover plate engaging the member, means for securing the cover plate to the die stock proper, whereby the die is clamped in the recess.

2. A die stock having a recessed portion therein for receiving the die, means for holding the die in place therein, said means including a member engaging the die, a cover plate engaging the member, means for securing the cover plate to the die stock proper, whereby the die is clamped in the recess, and means operated by the member for guiding the work while a thread is being cut.

3. A die stock having a recessed portion to loosely receive a one piece die, means for retaining the same in place therein, means for guiding the work to the die comprising a plurality of pivotally mounted guiding members, means for varying the opening between the said pivoted members for receiving the work, said means including a plate and operative connection between the said guiding means and the plate, and means for clamping the guiding means and the die in the stock.

4. In a die stock, the combination, of means for receiving a die, means for retaining the same in place therein, means for guiding the work to the die comprising a plurality of guiding members, means for varying the opening between the members for receiving the work, said means including a plate and operative connection between the guiding means and the plate, said operative means including a rotatable plate having eccentric shaped slots therein, a pin on each of the guiding means and engaging a slot, said plate being rotatable whereby the guide means may be operated, and means including a cover plate with which the guiding means have a pivotal connection for clamping the die and guide means to the stock.

5. In a die stock the combination with a recessed portion for receiving a die holding member, said die holding member having a recess in one side thereof for receiving the die, means for clamping the die and the die holder in place in the recess including a cover member engaging the die and, means for clamping the plate to the die stock including a cover plate having a pivotal connection at one end and a slot connection at the other for permitting the cover plate to be swung sidewise for gaining access to the recess.

6. In a die stock construction, the combination with a cover and clamping member for securing the die therein, a plurality of work guiding members pivotally connected to the cover member, means for operating the guiding members including a rotatable member located in the cover, the rotatable member having eccentric shaped openings to receive pins on the work guiding members, the inner surface of the work guiding members being such that the point of contact of the work and the pins in the slots are in radial lines, whereby the guide plates are retained in fixed position in all points of adjustment of the guide members.

7. A clamping and work guiding device for a die stock comprising, in combination, a member for engaging the die, and having eccentric shaped slots therein, a cover member in which the member is rotatably located, work guiding members having pivotal connections with the cover, and pins thereon for engaging the slots, whereby when the rotatable member is rotated the guiding members will be moved, and means for attaching the device to a die stock.

DAVID B. MILLER.